United States Patent Office 2,981,633
Patented Apr. 25, 1961

2,981,633
PROCESS FOR TREATING FERROUS METALS

Shipp C. Davis, Chattanooga, and William G. Ray, Signal Mountain, Tenn., assignors to Chas. Pfizer & Co., Inc., New York, N.Y., a corporation of Delaware No Drawing. Filed Jan. 7, 1960, Ser. No. 923

5 Claims. (Cl. 117—50)

This application is concerned with a new and useful process for porcelainizing metals. More particularly it is concerned with a novel process for pretreating iron and steel, hereinafter referred to as ferrous metals, in preparation for a surface coating with a porcelain enamel. This application is a continuation-in-part of patent applications Serial Nos. 768,081 filed October 20, 1958 and 831,934 filed August 6, 1959, both now abandoned.

A simplified flow diagram of the process is as follows:

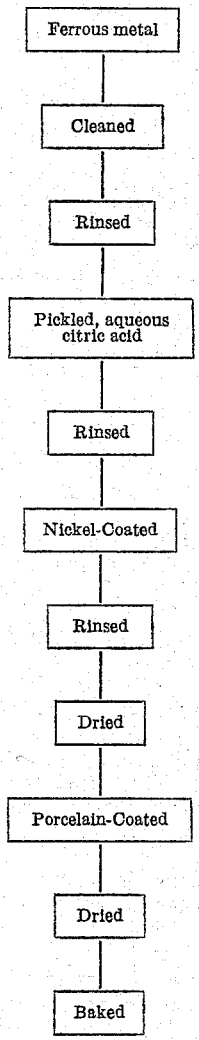

Porcelain enamel is a protective finish used for coating metals, particularly iron and steel. Its composition and its method of application will be described more fully hereinafter. It is especially valuable because of its translucence, hardness, heat resistance and abrasion resistance as well as its stability under thermal shock. Its chemical inertness coupled with its failure to absorb water, vapors, dyes, odor, flavor or chemicals make it particularly valuable in the chemical industry for the construction of large containers and conduits. These same attributes together with its attractive appearance make it particularly desirable about the home where it is finding increasing favor in coating cooking utensils, stoves, refrigerators, urinals, bath tubs and tile. Its chemical inertness and abrasion resistance permit it to withstand years of cleaning and disinfecting without showing appreciable wear. It is possible by the addition of suitable agents to produce porcelain enamels of a variety of colors.

There are two principal methods of applying a porcelain enamel. The first of these is the dry process in which an enamel powder is sprinkled onto a hot surface and melted to form a coating. The second is a wet process, and it is with this process that the present invention is concerned. It differs from the dry process in that the enamel is applied in the form of an aqueous emulsion or suspension and subsequently hardened by baking at high temperature.

The wet process for porcelainizing steel may be divided into three principal steps. These are: preparation of the frit, preparation of the enamel often referred to as preparation slip, and finally the coating of the surface. Heretofore, unless very expensive modifications were employed, this final coating has required the application of at least two coats, the so-called ground and finish coats. When the process of this invention is utilized only the finish coat is necessary.

In the preparation of the frit various refractory materials such as potash, feldspar and quartz are fused together with such fluxes as borax, soda ash, fluorospar, cryolite and lead oxide and opacifying agents typified by the oxides of titanium, antimony or zirconium. Other materials such as the oxides of cobalt, manganese and tin may be added to accentuate desirable properties, and the percentage composition of each ingredient may be varied to prepare different types of frits for the formulation of the diverse enamels to which the process described and claimed herein is applicable.

The ingredients of the frit are intimately mixed and heated to a temperature of from about 2,200 to about 2,300° F. for approximately four to six hours. The resulting melt is quenched in cold water to break it into a plurality of glass particles, generally round with a diameter of about one-sixteenth to one-eighth of an inch. These particles are used in the formation of the enamel slip.

A typical enamel slip for a ground coat is prepared by grinding together in a ball mill one hundred pounds of frit, seven pounds of clay, eight ounces of borax, four ounces of magnesium carbonate, two ounces of sodium nitrite and forty pounds of water. The clay is used to keep the ingredients in suspension in the water. Sodium nitrite causes fluocculation of the clay thereby enhancing its ability to keep particles in suspension. The borax and magnesium carbonate are added to improve the setting qualities of the enamel slip, that is, its ability to flow easily on the surface to be coated, drain evenly and set up to form a layer of the desired thickness. A typical finish coat will contain one hundred pounds of frit, five pounds of clay, four ounces of potassium carbonate and two ounces of sodium nitrite. To this may be added five grams of gold oxide or other material for coloring purposes and two pounds of titanium oxide to improve the capacity of the finished product.

A typical two-coat operation for the porcelain enameling of iron or steel parts in accordance with the wet process involves the following steps:

1. Cleaning
2. Rinsing
3. Pickling
4. Rinsing
5. Treatment with nickel sulfate
6. Rinsing
7. Neutralizing
8. Rinsing
9. Drying
10. Application of ground coat
11. Drying
12. Firing
13. Application of finished coat
14. Drying
15. Firing Steps 1 and 2 comprise the cleaning sequence, steps 3 and 4 the pickling sequence, steps 5 through 9 the nickel depositing sequence and steps 10 through 15 the porcelain enameling sequence.

A number of methods are available for cleaning the surface to be coated. These are alkali rinses, vapor degreasers and emulsion-type cleaners. Their purpose is to remove greases, oils, soap, dirt and drawing compounds such as soaps, borax and waxes which are applied to the surface of the metal to provide lubrication during the fabrication process. Typical alkali rinses may contain sodium hydroxide, sodium carbonate, sodium phosphate, sodium silicate or combinations of these. The part to be cleaned is simply immersed in the cleaning compound at about room temperature for a sufficient time to accomplish the desired result. This usually requires from about 10 to about 20 minutes. Vapor degreasers are especially useful for removing hydrocarbon residues from the surface of the metal and in the process the vapors of a low boiling solvent, for example, a chlorinated hydrocarbon solvent such as ethylene dichloride are allowed to condense on the surface of the metal to wash off the residual hydrocarbons. An emulsion-type cleaner may contain a non-ionic surfactant dissolved in naphtha or kerosene and the part to be cleaned is simply rinsed in the solution. Treatment with an emulsion-type cleaner is almost always followed by the alkali rinse described above.

After cleansing, the article is subjected to two aqueous rinses, the first, a hot rinse carried out at from about 175° to about 185° F. and the second carried out at about 55° to about 65° F.

The pickling operation is designed to remove iron oxide in the form of scale or rust by treatment with sulfuric acid or hydrochloric acid. Occasionally dilute phosphoric acid may be used. Sulfuric acid is used in approximately 6% aqueous solution and the operation takes place by dipping the part into the solution at from about 150 to about 160° F. The time will, of course, depend upon the condition of the surface of the metal. Sulfuric acid is the preferred pickling medium but hydrochloric acid may be similarly employed at a higher concentration (about 10% aqueous solution), the advantage being that it does not require the application of heat. It is, however, generally more expensive and the time required in the pickling bath is longer than is required with a sulfuric acid treatment. The article is then rinsed in cold water.

In the next operation, the article to be porcelainized is placed in a nickel sulfate bath. The purpose of this treatment is to deposit a coating of nickel on the surface of the metal. This deposit enhances the strength of the bond between the metal and the porcelain enamel. Typically, the nickel sulfate will be prepared in a concentration of approximately one-half ounce to three ounces per gallon of water in a wooden tank or a tank lined with lead or brick. The metal is immersed in the nickel sulfate solution for a period of from about 4 to about 8 minutes at a temperature of from 160 to 170° F. For optimum results, the pH of the solution is maintained between 3.2 and 3.6 by the addition of acid. When a metal surface is treated in this manner, there is deposited upon the surface a coating of nickel comprising from 0.03 to about 0.1 g. per square foot. The article is then rinsed in cold water.

Following the rinsing, the metal is washed with a neutralizing solution. Although other solutions may occasionally be used, the preferred solution contains borax and soda ash in a ratio of approximately 2:1. The mixture is dissolved in water at a concentration of approximately one-half ounce per gallon. The temperature is maintained at from about 165 to about 212° F. during the neutralizing operation. The time is from about two to about fifteen minutes. The article is again rinsed with water and dried. The article may be dried simply by standing at room temperature or by the application of heat.

In the next step the undercoat, that is, the enamel slip, is applied. It may be applied by dipping the article in a bath containing the enamel or alternatively the enamel may be sprayed on the surface to be coated. The article is first dried at from about 250 to about 400° F. and then baked at a temperature from approximately 1,300 to approximately 1,550° F. under non-reducing conditions. The temperature will depend upon the type of enamel which is applied. No special steps are ordinarily necessary to attain and maintain the non-reducing conditions, the hot air in the oven being perfectly adequate.

The finish coat is next applied by either dipping or spraying and the article is then dried as above and baked at a temperature of from about 1,300 to about 1,550° F. for from about 3 to about 6 minutes. The finish coat is generally baked at a lower temperature than is employed in the baking of the ground coat.

It has now been discovered that, provided certain critical conditions are met, it is possible to prepare an enamel coated ferrous metal object having all of the desirable qualities of objects prepared in accordance with the prior art two-coat method even though only one coat is applied.

It has long been a problem in the art to prepare enamel coated objects by a one-step process. Some advances have been made but, despite the advantages which accrue by decreasing the number of operations, they have generally been economically unattractive because they require special steel or special equipment.

The process of this invention comprises as an essential step treating, that is, pickling the metal to be porcelainized with aqueous citric acid at a temperature of from about 160° to about 212° F. prior to the nickel depositing sequence.

In a typical operation of the process of this invention, the article after cleaning by any of the methods described above is treated with a citric acid solution by either dipping or spraying. The balance of the process is substantially as described above except that it is not necessary to apply a ground coat.

The concentration of citric acid in aqueous solution which is suitable for use in the process varies from about 5% to about 20% by weight. It is preferred to use from approximately 8 to 15% by weight of aqueous citric acid since this combines the advantages of a relatively short treatment with the economic advantage of using a comparatively small amount of acid. Concentrations from 5 to 8% can be employed, but less advantageously since it has been found that these low concentrations require higher temperatures and longer immersion times. These latter are still within the disclosed temperature and immersion time ranges for the operation of the process. It is simply better economics to use more acid rather than higher temperatures and longer immersion times.

The temperature of the solution is maintained during the treatment at from about 160° to about 212° F. and preferably from 190 to 212° F. Higher temperatures within these ranges will generally be employed if the solution is to be applied by spraying because of the temperature drop inherent in any spraying operation. The treatment is continued from about 5 to about 30 minutes depending upon the gauge of the metal. Since metals other than 12 to 28 gauge are rarely porcelainized this time range is usually adequate. With 20 gauge steel, the time will be from about 5 to about 20 minutes.

The metal is next subjected to the ordinary nickel depositing sequence the first step consisting of treatment with aqueous nickel sulfate until there is deposited on the surface of the metal a total of from about 0.03 to about 0.15 g. per square foot. For the purpose of this invention, it is preferred to deposit from about 0.05 to about 0.1 g. per square foot. The metal is then rinsed with ordinary tap water.

The metal is then treated with a neutralizing solution as described above, rinsed and dried.

It is now discovered most surprisingly that as a result of this previous picking with citric acid, it is possible to directly apply a finish coat to the surface of the metal. The finish coat is applied in the same manner as described above.

In a typical operation of the process of this invention, the article to be treated is first cleaned. Preferably, it is cleaned with an alkali rinse by immersion in an aqueous solution of sodium hydroxide containing from about 10% to about 40% by weight of sodium hydroxide from about 100° to about 225° F. for a period of from about 10 to about 20 minutes. It may be desirable to subject certain products, particularly those which by reason of their method of manufacture or other reason have an oily deposit on their surface, to more than one alkali cleaning; and each alkali treatment except the last should be followed by an acid rinse to insure best cleaning results. This is well known to those skilled in the art.

After cleaning, the article is removed and rinsed in hot water at about 175 to 185° F. The article is then placed in an aqueous citric acid solution containing from about 5% to about 20% and preferably from about 8 to about 15% by weight of citric acid at a temperature of from about 160 to about 212° F. In a preferred operation, the article will be immersed at from about 190 to about 212° F. and will remain in the solution for from about 5 to about 20 minutes, preferably from about 10 to about 15. The article is then rinsed in water at from about 55 to about 65° F.

Upon removal from the aqueous rinse, nickel is deposited on the surface by immersion in aqueous nickel sulfate bath containing from about one-half ounce to about three ounces of nickel sulfate per gallon of water. The period of immersion is from about four to about eight minutes at a temperature of from about 160 to 170° F. The pH of the solution should be from about 2.5 to about 3.6, preferably 2.8 to 3.2. This can be maintained by the addition of acid, preferably mineral acids such as sulfuric, although at the higher pH, organic acids can be used. The article is then rinsed with water preferably by immersion in a water bath of from about 55 to about 65° F.

The metal is next treated with a neutralizing solution comprising a mixture of borax and soda ash in a ratio of approximately 2:1 dissolved in water at a concentration of approximately one-half ounce per gallon. The temperature is maintained at from about 165 to about 212° F. The total immersion time is from about 2 to about 15 minutes. After the neutralizing operation, the article is rinsed with water at from about 55 to about 212° F. and dried, preferably from about 185 to about 212° F.

The article is now ready for the application of the enamel slip, that is, the porcelain coating. The coating may be any of the various enamel coatings available commercially for cover coats containing the usual refractory materials, opacifiers, flocculating agents, etc. They may also contain coloring agents. The enamel is applied by spraying or dipping in accordance with standard industrial practice. The article is then dried at from about 250 to about 400° F. baked at from approximately 1,300 to approximately 1,550° F. for from about 3 to about 6 minutes. In preferred operations, the article is baked at from about 1,350 to about 1,500° F. for a period of from about two and one-half to about five minutes.

Occasionally, it may be helpful to add a minor proportion, that is, from about 1% to about 4% of a mineral acid such as hydrochloric or phosphoric acid to the citric acid bath. Phosphoric acid is particularly helpful in this respect since it decreases the time period during which the article to be porcelainized must remain in the citric acid bath. Thus, when citric acid alone is used, the preferred time is from 10 to 12 minutes. When to the citric acid bath containing from about 5% to about 20% citric acid by weight there is added from about 1% to about 4% by weight of phosphoric acid, the preferred time is reduced to from about 5 to about 8 minutes. The process even with the phosphoric acid is still operable in the above disclosed range of from about 5 to about 30 minutes. The addition of the mineral acid is, of course, not absolutely necessary to the performance of this invention, but those skilled in the art will recognize the advantage imparted by its use. It decreases the total production time and thus contributes markedly to the favorable economics of the process.

If aluminum ware is used as a container for the citric acid bath used in carrying out the process of this invention, it is helpful, although not necessary, to bubble air through the bath since this slows down the rate of corrosion of the aluminum. This is a property of the aluminum and not of the process. If ceramic or glass-lined ware is used, the use of air would serve no purpose whatsoever and simply add to the cost of the process.

There are many advantages to the use of the unique process of this invention. The most obvious of these are economic. Thus, the use of the ground coat is completely eliminated saving not only the original purchase price but also the operational and handling costs. Another and extremely important advantage is that the coating is thinner than would be obtained by the application of two coats. This minimizes the danger of chipping, a serious problem in the industry.

A more remote but certainly no less important advantage is that because of the savings in cost which have now been made available to the industry, articles which have heretofore been coated with less expensive and less desirable materials can now be coated with enamel and still remain economically competitive. These include, for example, exteriors of refrigerators, lawn furniture, soda fountain equipment and exterior signs.

The following examples are given solely for the purpose of illustration and are not to be construed as limitations of this invention, many variations of which are possible without departing from the spirit or scope thereof.

*Example 1*

A three-inch by six-inch piece of 12 gauge enameling iron suitable for the preparation of porcelain enameled tile was cleaned by immersion in aqueous sodium hydroxide and rinsed according to standard practice. It was then immersed in a 5% by weight aqueous solution of citric acid at 190° F. for 30 minutes. It was removed and rinsed with water at room temperature. The article was then immersed in a nickel sulfate bath containing nickel sulfate at a concentration of 2 ounces per gallon for a period of 4 minutes while maintaining the pH between 3.2 and 3.6 by the occasional addition of solid citric acid. The temperature was maintained between 160 and 170° F. This treatment deposited approximately 0.05 to 0.07 gram of nickel per square foot of surface. The iron was then immersed in an aqueous solution containing borax and soda ash in a ratio of 2:1 at a concentration of one-half ounce per gallon. The temperature was maintained at approximately 185° F. for 2 minutes. The article was then rinsed with water at room temperature and dried. The iron was then coated by spraying with commercial porcelain enamel and dried at about 250° F. The article was then baked at 1300° F. for 6 minutes.

*Example II*

A three-inch by six-inch piece of 28 gauge mild steel was cleaned by allowing the vapors of ethylene dichloride to condense on its surface. It was then immersed in a 20% by weight aqueous solution of citric acid at 160° F. for 5 minutes. It was removed and rinsed with water at room temperature. The article was then immersed in a nickel sulfate bath containing nickel sulfate at a concentration of one-half ounce per gallon for a period of 8 minutes while maintaining the pH between 3.2 and 3.6 by the occasional addition of solid boric acid. The temperature was maintained between 160 and 170° F. The iron was then immersed in an aqueous solution containing borax and soda ash in a ratio of 2:1 at a concentration of one-half ounce per gallon. The temperature was maintained at approximately 165° F. for 15 minutes. The article was then rinsed with water at 185° F. and dried. The iron was then coated by immersion with commercial porcelain enamel and dried at about 400° F. The article was then baked at 1,550° F. for 3 minutes.

*Example III*

A three-inch by six-inch piece of 12 gauge enameling iron suitable for the preparation of porcelain enameled tile was cleaned by immersion in aqueous sodium hydroxide and rinsed according to standard practice. It was then immersed in a 15% by weight aqueous solution of citric acid at 160° F. for 15 minutes. It was removed and rinsed with water at room temperature. The article was then immersed in a nickel sulfate bath containing nickel sulfate at a concentration of 2 ounces per gallon for a period of four minutes while maintaining the pH between 3.2 and 3.6 by the occasional addition of solid citric acid. The temperature was maintained between 160 and 170° F. This treatment deposited approximately 0.05 to 0.07 gram of nickel per square foot of surface. The iron was then immersed in an aqueous solution containing borax and soda ash in a ratio of 2:1 at a concentration of one-half ounce per gallon. The temperature was maintained at approximately 212° F. for 2 minutes. The article was then rinsed with water at 212° F. and dried. The iron was then coated by spraying with commercial porcelain enamel and dried at about 250° F. The article was then baked at 1300° F. for 6 minutes.

*Example IV*

A three-inch by six-inch piece of 28 gauge mild steel was cleaned by allowing the vapors of ethylene dichloride to condense on its surface. It was then immersed in a 10% by weight aqueous solution of citric acid containing 2% by weight of hydrochloric acid at 190° F. for 25 minutes. It was removed and rinsed with water at room temperature. The article was then immersed in a nickel sulfate bath containing nickel sulfate at a concentration of one-half ounce per gallon for a period of 8 minutes while maintaining the pH between 3.2 and 3.6 by the occasional addition of solid boric acid. The temperature was maintained between 160 and 170° F. The iron was then immersed in an aqueous solution containing borax and soda ash in a ratio of 2:1 at a concentration of one-half ounce per gallon. The temperature was maintained at approximately 165°F. for 15 minutes. The article was then rinsed with water at room temperature and dried. The iron was then coated by immersion with commercial porcelain enamel and dried at about 400° F. The article was then baked at 1,550° F. for 3 minutes.

*Example V*

A three-inch by six-inch piece of 16 gauge mild steel was cleaned with an emulsion type cleaner followed by immersion in 30% aqueous sodium hydroxide. It was then immersed in a 15% by weight aqueous solution of citric acid at 212° F. for 15 minutes. It was removed and rinsed with water at room temperature. The article was then immersed in a nickel sulfate bath containing nickel sulfate at a concentration of 4 ounces per gallon for a period of 4 minutes while maintaining the pH between 3.2 and 3.6 by the occasional addition of solid citric acid. The temperature was maintained between 160 and 170° F. The iron was then immersed in an aqueous solution containing borax and soda ash in a ratio of 2:1 at a concentration of one-half ounce per gallon. The temperature was maintained at approximately 212° F. for 2 minutes. The article was then rinsed with water at room temperature and dried. The iron was then coated by spraying with commercial porcelain enamel and dried at about 350° F. The article was then baked at 1450° F. for 4 minutes.

*Example VI*

A three-inch by six-inch piece of 16 gauge mild steel was cleaned with an emulsion type cleaner followed by immersion in 30% aqueous sodium hydroxide. It was then immersed in a 10% by weight aqueous solution of citric acid containing 1% by weight of phosphoric acid at 200° F. for 5 minutes. It was removed and rinsed with water at room temperature. The article was then immersed in a nickel sulfate bath containing nickel sulfate at a concentration of 4 ounces per gallon for a period of 4 minutes while maintaining the pH between 3.2 and 3.6 by the occasional addition of solid citric acid. The temperature was maintained between 160 and 170° F. The iron was then immersed in an aqueous solution containing borax and soda ash in a ratio of 2:1 at a concentration of one-half ounce per gallon. The temperature was maintained at approximately 212° F. for 2 minutes. The article was then rinsed with water at 195° F. and dried. The iron was then coated by spraying with commercial porcelain enamel and dried at about 350° F. The article was then baked at 1450° F. for 4 minutes.

*Example VII*

A three-inch by six-inch piece of 16 gauge mild steel was cleaned with an emulsion type cleaner followed by immersion in 30% aqueous sodium hydroxide. It was then immersed in an 8% by weight aqueous solution of citric acid containing 4% by weight of phosphoric acid at 180° F. for 8 minutes. It was removed and rinsed with water at room temperature. The article was then immersed in a nickel sulfate bath containing nickel sulfate at a concentration of 4 ounces per gallon for a period of 4 minutes while maintaining the pH between 3.2 and 3.6 by the occasional addition of solid citric acid. The temperature was maintained between 160 and 170° F. The iron was then immersed in an aqueous solution containing borax and soda ash in a ratio of 2:1 at a concentration of one-half ounce per gallon. The temperature was maintained at approximately 212° F. for 2 minutes. The article was then rinsed with water at 195° F. and dried. The iron was then coated by spraying with commercial porcelain enamel and dried at about 350° F. The article was then baked at 1450° F. for 4 minutes.

*Example VIII*

A three-inch by six-inch piece of 12 gauge enameling iron suitable for the preparation of porcelain enameled tile was cleaned by immersion in aqueous sodium hydroxide and rinsed according to standard practice. It was then immersed in a 5% by weight aqueous solution of citric acid at 190° F. for 30 minutes. It was removed and rinsed with water at room temperature. The article was then immersed in a nickel sulfate bath containing nickel sulfate at a concentration of 2 ounces per gallon for a period of 4 minutes while maintaining the pH between 2.8 and 3.2 by the occasional addition of solid citric acid. The temperature was maintained between 160 and 170° F. This treatment deposited approximately 0.05 to 0.07 gram of nickel per square foot of surface. The iron was then immersed in an aqueous solution containing borax and soda ash in a ratio of 2:1 at a concentration of one-half ounce per gallon. The temperature was maintained at approximately 185° F. for 2 minutes. The article was then rinsed with water at room temperature and dried. The iron was then coated by spraying with commercial porcelain enamel and dried at about 250° F. The article was then baked at 1300° F. for 6 minutes.

*Example IX*

A three-inch by six-inch piece of 28 gauge mild steel was cleaned by allowing the vapors of ethylene dichloride to condense on its surface. It was then immersed in a 20% by weight aqueous solution of citric acid at 160° F. for 5 minutes. It was removed and rinsed with water at room temperature. The article was then immersed in a nickel sulfate bath containing nickel sulfate at a concentration of one-half ounce per gallon for a period of 8 minutes while maintaining the pH between 2.8 and 3.2 by the occasional addition of solid boric acid. The temperature was maintained between 160 and 170° F. The iron was then immersed in an aqueous solution containing borax and soda ash in a ratio of 2:1 at a concentration of one-half ounce per gallon. The temperature was maintained at approximately 165° F. for 15 minutes. The article was then rinsed with water at 185° F. and dried. The iron was then coated by immersion with commercial porcelain enamel and dried at about 400° F. The article was then baked at 1,550° F. for 3 minutes.

*Example X*

A three-inch by six-inch piece of 12 gauge enameling iron suitable for the preparation of porcelain enameled tile was cleaned by immersion in aqueous sodium hydroxide and rinsed according to standard practice. It was then immersed in a 15% by weight aqueous solution of citric acid at 160° F. for 15 minutes. It was removed and rinsed with water at room temperature. The article was then immersed in a nickel sulfate bath containing nickel sulfate at a concentration of 2 ounces per gallon for a period of four minutes while maintaining the pH between 2.8 and 3.2 by the occasional addition of solid citric acid. The temperature was maintained between 160 and 170° F. This treatment deposited approximately 0.05 to 0.07 gram of nickel per square foot of surface. The iron was then immersed in an aqueous solution containing borax and soda ash in a ratio of 2:1 at a concentration of one-half ounce per gallon. The temperature was maintained at approximately 212° F. for 2 minutes. The article was then rinsed with water at 212° F. and dried. The iron was then coated by spraying with commercial porcelain enamel and dried at about 250° F. The article was then baked at 1300° F. for 6 minutes.

*Example XI*

A three-inch by six-inch piece of 16 gauge mild steel was cleaned with an emulsion type cleaner followed by immersion in 30% aqueous sodium hydroxide. It was then immersed in a 15% by weight aqueous solution of citric acid at 212° F. for 15 minutes. It was removed and rinsed with water at room temperature. The article was then immersed in a nickel sulfate bath containing nickel sulfate at a concentration of 4 ounces per gallon for a period of 4 minutes while maintaining the pH between 2.8 and 3.2 by the occasional addition of solid citric acid. The temperature was maintained between 160 and 170° F. The iron was then immersed in an aqueous solution containing borax and soda ash in a ratio of 2:1 at a concentration of one-half ounce per gallon. The temperature was maintained at approximately 212° F. for 2 minutes. The article was then rinsed with water at room temperature and dried. The iron was then coated by spraying with commercial porcelain enamel and dried at about 350° F. The article was then baked at 1450° F. for 4 minutes.

What is claimed is:

1. A process for the porcelain enameling of ferrous metal objects comprising the steps of cleaning the ferrous metal, then pickling with an aqueous solution of citric acid containing from about 5% to about 20% by weight of acid at a temperature of from about 160° to about 212° F. for from about 5 to about 30 minutes, then depositing nickel on the surface in an amount of from about 0.03 to about 0.15 gram per square foot, then coating the object with porcelain enamel, drying at from about 250 to about 400° F. and baking same at from about 1300° to about 1550° F. for from about 3 to about 6 minutes.

2. A process as in claim 1 wherein from about 0.05 to about 0.1 gram per square foot of nickel is deposited on the surface of the object.

3. A process as in claim 1 wherein from about 1% to about 4% by weight of phosphoric acid is added to the said aqueous solution of citric acid cointaining from about 5% to about 20% by weight of citric acid.

4. A process which comprises pickling cleaned ferrous metal objects with an aqueous solution of citric acid containing from about 5% to about 20% by weight of acid at a temperature of from about 160° to about 212° F. for from about 5 to about 30 minutes, then depositing on the surface thereof from about 0.03 to about 0.15 gram of nickel per square foot, then applying a porcelain enamel coating, drying at from about 250° to about 400° F. and baking at from about 1300° F. to about 1550° F. for from about 3 to about 6 minutes.

5. In a process for porcelain enameling ferrous metal objects wherein the cleaned steel is pickled with acid, plated with nickel, coated with porcelain enamel, dried at from about 250 to about 400° F. and baked at from about 1300° to about 1550° F. for from about 3 to about 6 minutes, the improvement which comprises pickling with an aqueous solution of critic acid containing from about 5% to about 20% by weight of acid at a temperature of from about 160° to about 212° F. for from about 5 to about 30 minutes prior to depositing nickel.

References Cited in the file of this patent

UNITED STATES PATENTS

| | | |
|---|---|---|
| 865,700 | Hernsheim et al. | Sept. 10, 1907 |
| 1,334,092 | Harmeling et al. | Mar. 16, 1920 |
| 2,768,904 | Chester | Oct. 30, 1956 |
| 2,930,106 | Wrotnowski | Mar. 29, 1960 |